United States Patent [19]

Fairbanks

[11] 4,406,381
[45] Sep. 27, 1983

[54] STYLUS DISPENSING APPARATUS AND METHOD

[75] Inventor: David W. Fairbanks, Monmouth Junction, N.J.

[73] Assignee: RCA Corporation, New York, N.Y.

[21] Appl. No.: 279,187

[22] Filed: Jun. 30, 1981

[51] Int. Cl.³ ............................................. B65H 1/24
[52] U.S. Cl. ...................................... 221/1; 221/198; 221/227; 221/232; 221/238
[58] Field of Search ........... 221/232, 251, 198, 312 A, 221/224, 225, 236, 238, 1, 227, 226

[56] References Cited

U.S. PATENT DOCUMENTS 1,286,809  12/1918  Shaw ................................... 221/232
3,020,704   2/1962  Stegmaier ......................... 221/232 X
3,752,361   8/1973  VanLinder et al. ................. 221/251

Primary Examiner—Joseph J. Rolla
Assistant Examiner—Kevin P. Shaver
Attorney, Agent, or Firm—Birgit E. Morris; Donald S. Cohen; Thomas H. Magee

[57] ABSTRACT

An apparatus for individually dispensing a plurality of styli, juxtaposed in a row lying along a first path within a guide slot having a dispensing section thereof terminating at a reference surface of a housing, has an arm shaped to slide within the guide slot whereby the lead stylus in the row is held against the reference surface. The apparatus comprises a curved spring plate and piston disposed adjacent the guide slot for moving the reference surface along the first path toward the arm in a manner whereby the arm, along with the row of styli, is pushed backward a predetermined distance along the first path to a holdback position, and a second piston disposed adjacent the housing for holding the arm stationary at the holdback position while a dispensing member removes the lead stylus from the row of styli.

11 Claims, 7 Drawing Figures

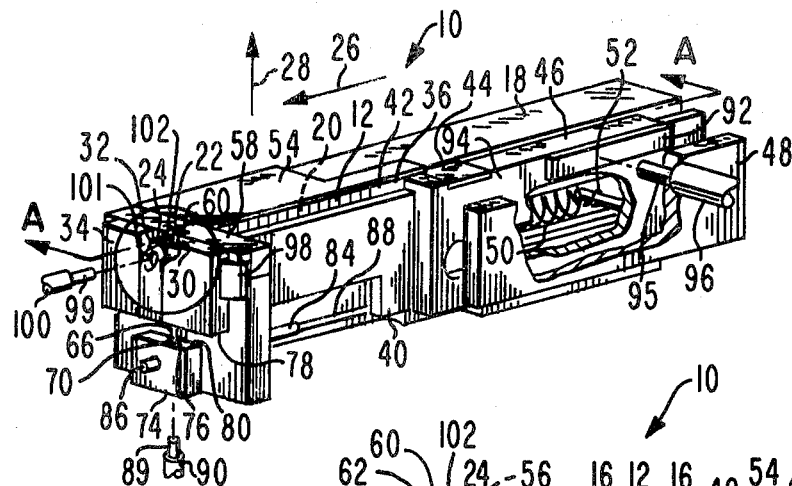
Fig. 1
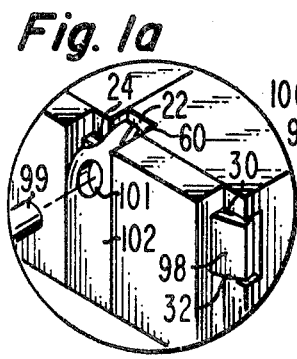
Fig. 1a
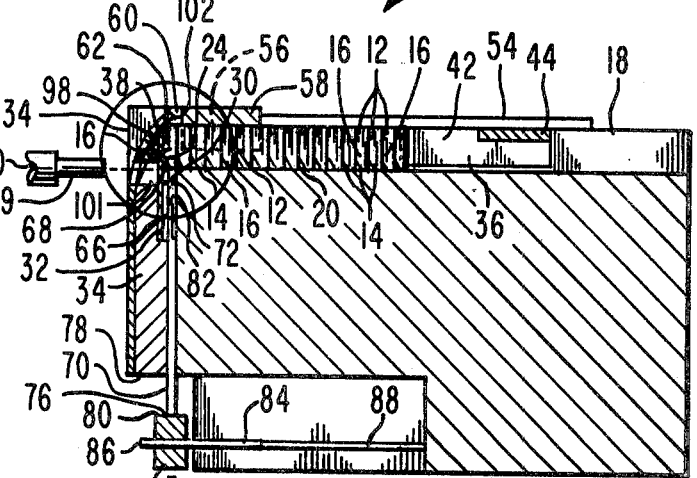
Fig. 3
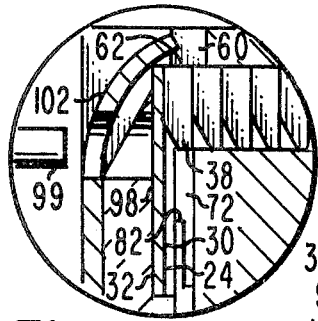
Fig. 3a
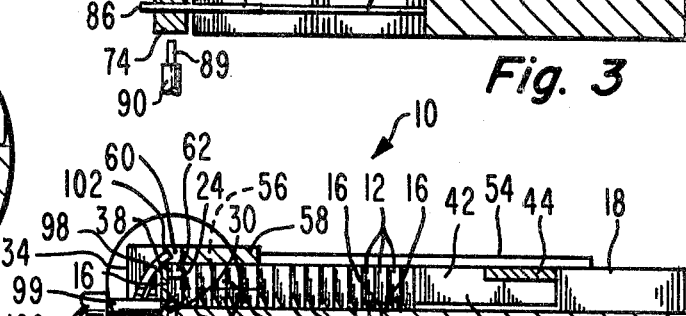
Fig. 4
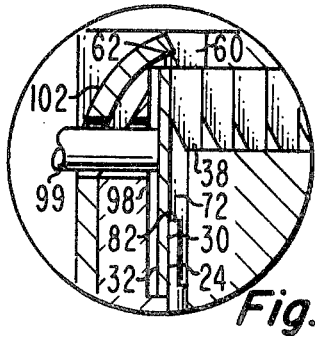
Fig. 4a
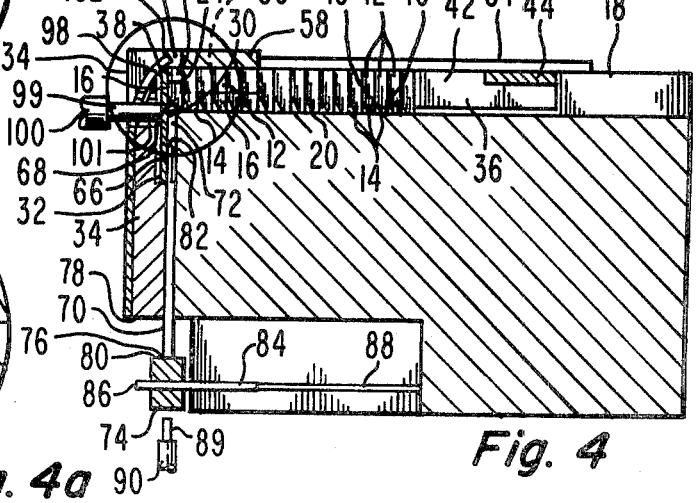

STYLUS DISPENSING APPARATUS AND METHOD

This invention relates to an apparatus and method for dispensing a plurality of styli, each stylus having a tip at one end thereof, wherein the tip breakage is minimized during the dispensing step.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus is typically a diamond log which is shaped in the form of a parallelapiped having a thickness of about 0.25 millimeter and a length of about 2 millimeters. The shape of the stylus tip forms a footprint. Many shapes are possible, and the footprint dimensions are quite variable although extremely small. The stylus is usually supported by a suspension system mounted within a playback cartridge.

In the playback cartridge, the stylus is typically mounted on an arm attached to the cartridge in a manner wherein the arm is capable of flexible movement with respect to the cartridge. In one embodiment, the arm has a plastic fitting attached at the free end. This plastic fitting is designed to actually hold the stylus. In manufacturing the cartridge, the diamond stylus is assembled to the plastic fitting before the arm is attached to the cartridge. An automatic handling and dispensing technique, which allows the diamond stylus to be precisely assembled to the fitting, is described in a commonly-owned patent application of R. R. Demers and R. E. Schneller entitled "AUTOMATIC STYLUS ASSEMBLY APPARATUS AND METHOD", filed on Jan. 30, 1981, and having Ser. No. 230,258. This technique permits loading a large quantity of styli into a magazine, and dispensing the styli singly in a manner that enables the assembly of each stylus to the plastic fitting so that a preestablished length of the diamond stylus protrudes from the bottom of the fitting, regardless of the length of the stylus. The present invention provides a stylus dispensing apparatus and method which minimizes the diamond tip breakage during the dispensing step.

SUMMARY OF THE INVENTION

The present invention comprises an apparatus for individually dispensing a plurality of styli, juxtaposed in a row lying along a first path within a guide slot having a dispensing section thereof terminating at a reference surface of a housing. The apparatus has an arm shaped to slide within the guide slot whereby the lead stylus in the row is held against the reference surface. The apparatus comprises means disposed adjacent the guide slot for moving the reference surface along the first path toward the arm in a manner whereby the arm, along with the row of styli, is pushed backward a predetermined distance along the first path to a holdback position. The apparatus further comprises means disposed adjacent the housing for holding the arm stationary at the holdback position while a dispensing member removes the lead stylus from the row of styli.

BRIEF DESCRIPTION OF THE DRAWING

FIG. 1 is a perspective view illustrating one embodiment of the novel dispensing apparatus of the present invention.

FIGS. 3 and 4 are cross-sectional views taken along line A—A of FIG. 1 at different steps of the present novel method.

FIGS. 1a, 3a and 4a are blow ups of the circled portions in the respective FIGS. 1, 3 and 4.

DETAILED DESCRIPTION OF THE PREFERRED EMBODIMENT

Figure 2:
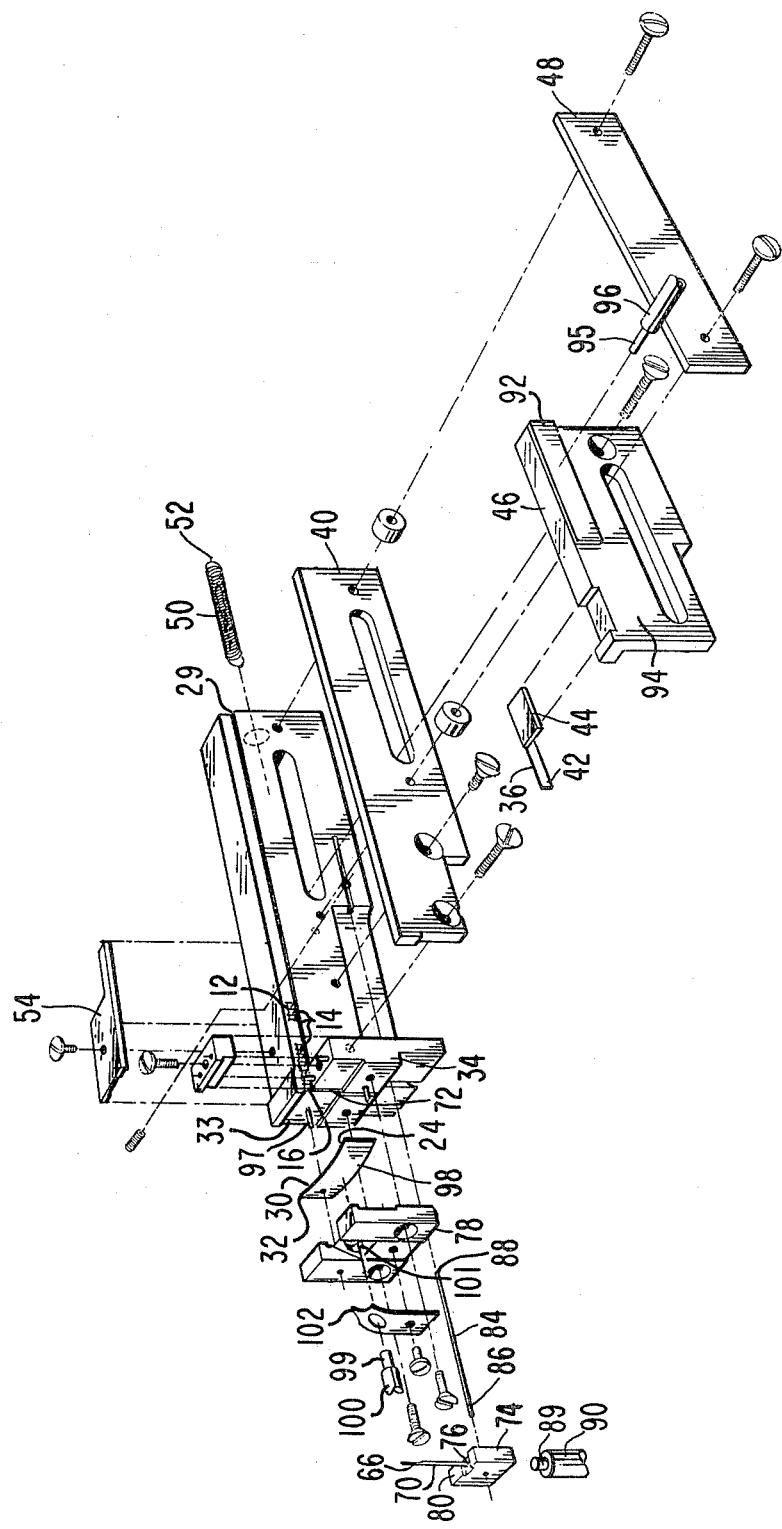
FIG. 2 is an exploded view of the embodiment illustrated in FIG. 1.

In FIGS. 1 and 2 of the drawing, there is shown one embodiment of an apparatus 10 for individually dispensing a plurality of styli 12, each stylus 12 having a tip 14 at one end 16 thereof. The apparatus 10 comprises a housing 18 including a guide slot 20 having a dispensing section 22 terminating at a reference surface 24 of the housing 18. The guide slot 20 is adapted to hold a plurality of styli 12 juxtaposed in a row lying along a first path within the guide slot 20, oriented along a first direction indicated by arrow 26. Each stylus 12 is oriented lengthwise along a second direction parallel to the reference surface 24, indicated by arrow 28, with the tip 14 pointing downward and protected by a relief groove 29 located along the bottom of the guide slot 20. The guide slot 20 may be longitudinally shaped, and the reference surface 24 may comprise the concave surface 30 of a curved spring plate 32 supported within a guide channel 33 disposed at one end 34 of the housing 18, as further described below. In the present embodiment, the housing 18 and curved spring plate 32 are fabricated from metal stock by machining to within a precise tolerance.

The apparatus 10 has an arm 36 shaped to slide within the guide slot 20 along the first path. The arm 36 is connected to the housing 18 by means for pushing the arm 36 against the row of styli 12 along the first path toward the reference surface 24, whereby the lead stylus 38 in the row is held against the reference surface 24. Preferably, the housing 18 includes a bar 40 disposed adjacent the guide slot 20 along the first path. In the preferred embodiment, the arm 36 comprises a metallic strip having one portion 42 thereof disposed within the guide slot 20 and a second portion 44 thereof connected to a carriage 46 movably supported by the bar 40. The carriage 46 is held adjacent the bar 40 by a retaining member 48 connected to the housing 18 in a manner allowing the carriage 46 to move along the first path.

The pushing means comprises a helical spring 50 having one end connected to the housing 18 and the other end 52 thereof connected to the carriage 46 is a manner such that the spring 50 causes the carriage 46 to move toward the reference surface 24. In the present example, the apparatus 10 has a removable cover plate 54 affixed to the housing 18 along the guide slot 20 and designed to retain the styli 12 within the slot 20. Attached to the housing 18 adjacent the top side 56 of the dispensing section 22 is a metering plate 58. The metering plate 58 has an opening 60 therethrough substantially tangent to the reference surface 24 along the second direction and positioned adjacent the other end 62 of the lead stylus 38 opposite the one end 16 thereof. The opening 60 has a length less than the length of each of the styli 12 and a width slightly greater than the width of each of the styli 12, so as to enable no more than one of the styli 12 to simultaneously pass therethrough.

The apparatus 10 further comprises a dispensing member 66 supported by the housing 18 at a first position located adjacent the bottom side 68 of the dispensing section 22 opposite the top side 56. The dispensing member 66 is adapted to slide upward along a second path parallel to the reference surface 24, thereby contacting and pushing the one end 16 of the lead stylus 38, to a second position whereat a part of the dispensing member 66 meets a stopping surface of the housing 18. The top end of the dispensing member 66 is shaped to contact only a portion of the one end 16 of the lead stylus 38 separate from the tip 14.

In the embodiment illustrated in FIGS. 1 and 2, the dispensing member 66 comprises a wire 70 having a thickness, at the top end thereof, smaller than half of the width of each of the styli 12. The one end 34 of the housing 18 has a groove 72 disposed therein which is shaped to guide the upper movement of the wire 70 to the second position. In this embodiment, the part of the dispensing member 66 which meets a stopping surface comprises a block 74 affixed to one end 76 of the wire 70. In the present example, the stopping surface of the housing 18 comprises a bottom surface 78 at the one end 34 of the housing 18, the block 74 being shaped so as to allow a surface 80 thereof to contact the bottom surface 78. Preferably, the top end of the wire 70 has a V-groove 82 disposed therein and shaped to conform with the contact portion of the one end 16 of the lead stylus 38. In the present embodiment, the apparatus 10 includes a flexible coupling rod 84 having one end 86 attached to the dispensing member 66 and the other end 88 connected to the housing 18. The flexible coupling rod 84 is adapted to return the dispensing member 66 to the first position after being moved to the second position by the piston 89 of an air-operated ejector cylinder 90.

The improvement in the present apparatus 10 comprises means disposed adjacent the housing 18 for holding the arm 36 stationary at a holdback position while the dispensing member 66 removes the lead stylus 38 from the row of styli 12. In the present embodiment, the holding means comprises means for clamping the carriage 46 firmly against the bar 40 in a manner such that the carriage 46, along with the arm 36, is prevented from moving along the first path, thereby causing the helical spring 50 to become inoperative. Preferably, the clamping means comprises a rubber strip 92 attached along an external surface 94 of the carriage 46, together with an air-actuated piston 95 of a clamping air cylinder 96. The piston 95 of this clamping air cylinder 96 is positioned to contact the rubber strip 92 and force the carriage against the bar 40, thereby preventing the carriage from moving along the first path.

The apparatus 10 further comprises means disposed adjacent the guide slot 20 for moving the reference surface 24 along the first path toward the arm 36 in a manner whereby the arm 36, along with the row of styli 12, is pushed backward a predetermined distance along the first path to the holdback position. In the present embodiment, the moving means comprises the curved spring plate 32, together with means for flexing the plate 32. The spring plate 32 is supported within the guide channel 33, disposed at the one end 34 of the housing 18, in a manner such that the concave surface 30 of the plate 32 forms the reference surface 24. Preferably, a dowel pin 97 is utilized to position the plate 32 at a particular location within the guide channel 33. The guide channel 33 is a rectangular shaped groove formed at the one end 34, and has a thickness such that the flexing of the spring plate 32 is restricted to a predetermined distance of approximately fifty micrometers (0.002 inches). In other words, the rectangular channel 33 located in the one end 34 of the housing 18 captivates the curved spring plate 32 and restricts its flexing motion to about fifty micrometers along the axis of the row of styli 12, i.e., along the first direction.

The means for flexing the spring plate 32 is disposed adjacent the convex surface 98 of the spring plate 32, in order to be able to push the lead stylus 38 backward. In the present embodiment, the flexing means comprises an air-actuated piston 99 of a push-back air cylinder 100. The piston 99 of the push-back air cylinder 100 is positioned to contact the convex surface 98 of the spring plate 32, through an opening 101 in the one end 34 of the housing, and push the plate backward toward the arm, as described further below. In the present embodiment, the housing 18 also includes a stylus pressing spring 102 for guiding the lead stylus 38 during the dispensing operation.

In the present method of individually dispensing a plurality of the styli 12, the reference surface 24 is first moved along the first path toward the arm 36 in a manner whereby the arm 36, along with the row of styli 12, is pushed backward a predetermined distance along the first path to the holdback position. In the preferred embodiment, this moving step is performed by contacting the convex surface 98 of the spring plate 32 with the piston 99 of the push-back air cylinder 100 and pushing the plate 32 backward toward the arm 36, as illustrated in FIGS. 3 and 4. This operation is accomplished by applying air to the push-back air cylinder 100. As shown in FIG. 4, the central portion of the spring plate 32, along with the row of styli, is moved backward in the housing 18 approximately 50 micrometers. At this time, the arm 36 is located at the holdback position.

With the arm 36 at the holdback position, the arm 36 is held stationary at this holdback position by clamping the carriage 46 firmly against the bar 40 in a manner such that the carriage 46, along with the arm 36, is prevented from moving along this first path. Preferably, this clamping step is accomplished by actuating the piston 95 of the clamping air cylinder 96 in order to contact the rubber strip 92 with the piston 95 of the clamping air cylinder 96 and force the carriage 46 against the bar 40, thereby preventing the carriage 46 from moving along the first path. This step will cause the helical spring 50 to become inoperative, i.e., it can not cause the carriage 46 to move toward the reference surface 24.

The reference surface 24 is now returned to its original position by shutting off the air to the push-back air cylinder 100. This allows the spring plate 32 to flex forward away from the arm 36, thereby allowing the plate 32 to return to its original position. This provides approximately fifty micrometers clearance between the lead stylus 38 and the reference surface 24, thus allowing the lead stylus 38 a small "clearance" in which to move away from the second stylus adjacent thereto and thereby relieve any pressure exerted on the lead stylus 38 by the second stylus. The essence of the present invention is that this "clearance" prevents the second stylus adjacent the lead stylus 38 from being pressed against the lead stylus 38, thereby minimizing the diamond tip breakage during the dispensing step.

At this time, the air-operated ejector cylinder 90 is actuated, causing the dispensing member 66 to remove the lead stylus 38 from the row of styli 12. For additional information, this removing step is fully described in the above-identified patent application, Ser. No. 230,258. After the lead stylus 38 is ejected, the air to the clamping air cylinder 96 is shut off in order to release its piston 95 and allow the spring-loaded arm, together with the row of styli 12, to move forward. The above-described dispensing cycle is then repeated.

What is claimed is:

1. In an apparatus for individually dispensing a plurality of styli comprising a housing including a guide slot having a dispensing section thereof terminating at a reference surface of said housing, said guide slot adapted to hold a plurality of said styli juxtaposed in a row lying along a first path within said guide slot, said apparatus also including an arm shaped to slide within said guide slot along said first path and connected to said housing by means for pushing said arm forward against said row of styli along said first path toward said reference surface whereby the lead stylus in said row is held against said reference surface, said apparatus further including a dispensing member supported by said housing adjacent a side of said dispensing section and adapted to slide along a second path parallel to said reference surface in order to contact and remove said lead stylus from said row of styli, the improvement in said apparatus comprising:
 means disposed adjacent said guide slot for moving said reference surface along said first path toward said arm in a manner whereby said arm, along with said row of styli, is pushed backward a predetermined distance along said first path to a holdback position, and
 means disposed adjacent said housing for holding said arm stationary at said holdback position while said dispensing member removes said lead stylus from said row of styli.

2. An apparatus as defined in claim 1 wherein said moving means comprises:
 a curved spring plate supported within a guide channel of said housing in a manner such that a concave surface of said spring plate forms said reference surface, and
 means disposed adjacent a convex surface of said spring plate for flexing said plate within said guide channel in order to push said lead stylus backward.

3. An apparatus as defined in claim 2 wherein said guide channel is a rectangular-shaped groove having a thickness such that the flexing of said spring plate is restricted to a predetermined distance of approximately fifty micrometers.

4. An apparatus as defined in claim 2 wherein said flexing means comprises a piston of a first air cylinder positioned to contact the convex surface of said spring plate and push said plate backward toward said arm.

5. An apparatus as defined in claim 1 wherein said housing includes a bar disposed adjacent said guide slot along said first path, wherein said arm comprises a metallic strip having one portion thereof disposed within said guide slot and a second portion thereof connected to a carriage movably supported by said bar, said carriage being held adjacent said bar by a retaining member connected to said housing in a manner allowing said carriage to move along said first path, and wherein said holding means comprises means for clamping said carriage firmly against said bar in a manner such that said carriage, along with said arm, is prevented from moving along said first path, thereby rendering said pushing means inoperative.

6. An apparatus as defined in claim 5 wherein said clamping means comprises:
 a rubber strip attached along an external surface of said carriage, and
 a piston of a second air cylinder positioned to contact said rubber strip and force said carriage against said bar, thereby preventing said carriage from moving along said first path.

7. In a method of individually dispensing a plurality of styli juxtaposed in a row lying along a first path within a guide slot having a dispensing section thereof terminating at a reference surface of a housing, said row of styli being pushed forward along said first path by an arm shaped to slide within said guide slot whereby the lead stylus in said row is held against said reference surface, wherein a dispensing member supported by said housing adjacent a side of said dispensing section slides along a second path parallel to said reference surface and contacts and removes said lead stylus from said row of styli, the improvement in said method comprising the steps of:
 moving said reference surface along said first path toward said arm in a manner whereby said arm, along with said row of styli, is pushed backward a predetermined distance along said first path to a holdback position, and
 holding said arm stationary at said holdback position while said dispensing member removes said lead stylus from said row of styli.

8. A method as recited in claim 7 further comprising, after said holding step but prior to said removing step, the step of returning said reference surface to its original position.

9. A method as recited in claim 8 wherein said reference surface comprises a concave surface of a curved spring plate supported within a guide channel of said housing, wherein said moving step is performed by contacting a convex surface of said spring plate with a piston of a first air cylinder and pushing said plate backward toward said arm, and wherein said returning step is performed by shutting off the air to said first cylinder in order to allow said spring plate to flex forward away from said arm, thereby allowing said plate to return to its original position.

10. A method as recited in claim 7 wherein said housing includes a bar disposed adjacent said guide slot along said first path, wherein said arm comprises a metallic strip having one portion thereof disposed within said guide slot and a second portion thereof connected to a carriage movably supported by said bar, said carriage being held adjacent said bar by a retaining member connected to said housing in a manner allowing said carriage to move along said first path, and wherein said holding step is performed by clamping said carriage firmly against said bar in a manner such that said carriage, along with said arm, is prevented from moving along said first path.

11. A method as recited in claim 10 wherein a rubber strip is attached along an external surface of said carriage, and wherein said clamping step is performed by contacting said rubber strip with a piston of a second air cylinder and forcing said carriage against said bar, thereby preventing said carriage from moving along said first path.

* * * * *